United States Patent [19]

Kashiwagi et al.

[11] Patent Number: 4,625,411
[45] Date of Patent: Dec. 2, 1986

[54] APPARATUS FOR DETECTING ROTATION OF STEERING WHEEL

[75] Inventors: Hideki Kashiwagi, Nishio; Shigeyuki Akita, Okazaki; Hiroaki Tanaka, Aichi; Akira Kuno, Obu, all of Japan

[73] Assignees: Nippondenso Co., Ltd., Kariya; Nippon Soken, Inc., Nishio, both of Japan

[21] Appl. No.: 739,473

[22] Filed: May 30, 1985

[30] Foreign Application Priority Data

Jun. 1, 1984 [JP] Japan .................................. 59-113751

[51] Int. Cl.$^4$ ...................... G08C 19/10; G01B 11/26
[52] U.S. Cl. ..................................... 33/1 PT; 33/1 N; 340/870.37; 324/61 R
[58] Field of Search .............................. 33/1 PT, 1 N; 340/870.37, 347 D; 324/61 R; 250/231 SE

[56] References Cited

U.S. PATENT DOCUMENTS

| | | |
|---|---|---|
| 4,350,981 | 9/1982 | Tanaka et al. . |
| 4,418,347 | 11/1983 | Tanaka et al. . |
| 4,418,348 | 11/1983 | Tanaka et al. . |
| 4,423,417 | 12/1983 | Tanaka et al. . |
| 4,477,810 | 10/1984 | Tanaka et al. . |
| 4,495,700 | 1/1985 | Ernst ................................. 33/1 PT |
| 4,499,465 | 2/1985 | Tanaka et al. . |

FOREIGN PATENT DOCUMENTS 2022267 12/1979 United Kingdom ............... 33/1 PT

*Primary Examiner*—Harry N. Haroian
*Attorney, Agent, or Firm*—Cushman, Darby & Cushman

[57] ABSTRACT

An apparatus for detecting a rotation of, for example, an automotive steering wheel has comprises a rotary plate fixed to a shaft and rotatable in accordance with a rotation of the steering wheel, an electric circuit for detecting a rotation of the rotary plate; a rotary member rotatable in accordance with a rotation of the shaft; a first opening for detecting a reference position signal provided in the rotary plate, a second opening for detecting a reference position signal provided in the rotary member, a reduction gear mechanism for reducing the rotational speed of the rotary member such as to allow the first and second signal detecting openings to be aligned with each other once in a plurality of rotations of the shaft, and photo electro transducers for detecting a reference position disposed in a line passing through the first and second signal detecting openings. The position detecting transducers outputting reference position signal upon an alignment of the first and second signal detecting openings with the line.

6 Claims, 19 Drawing Figures

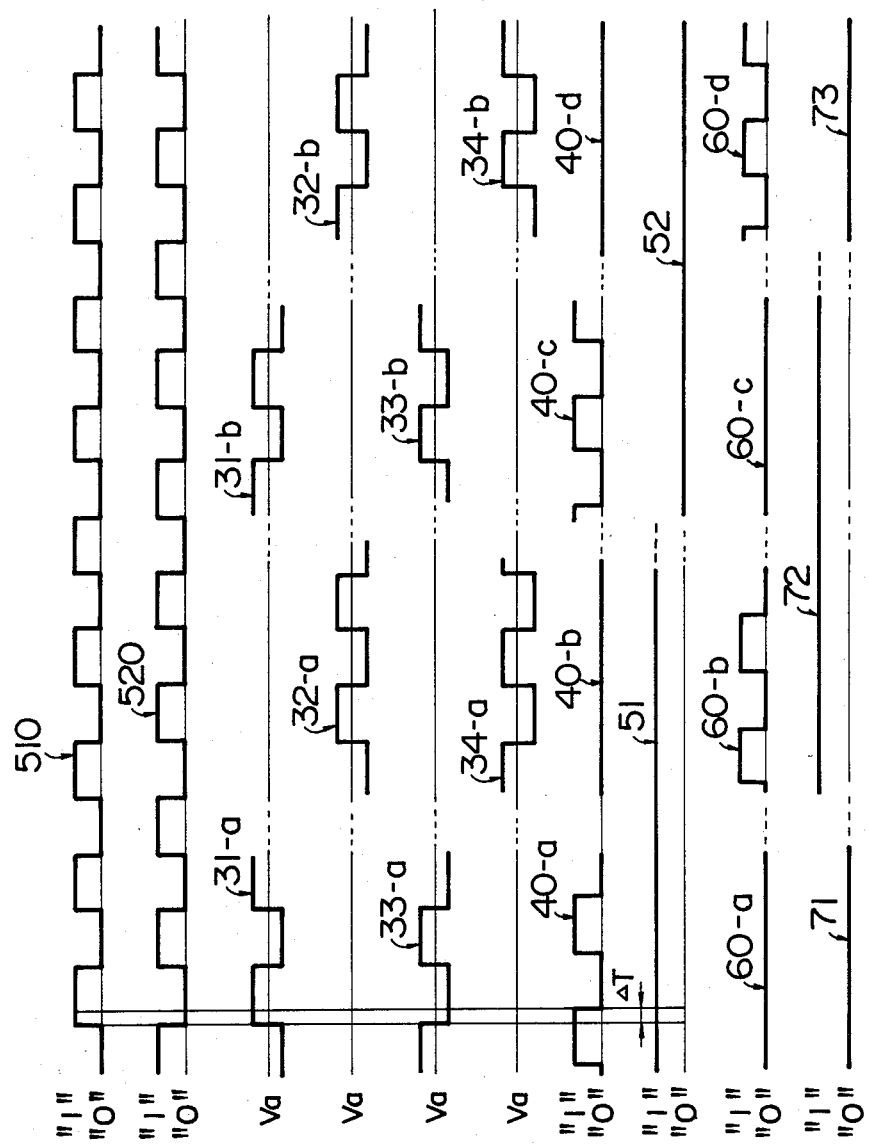

APPARATUS FOR DETECTING ROTATION OF STEERING WHEEL

BACKGROUND OF THE INVENTION

1. Field of the Invention

The present invention relates to an apparatus for detecting a rotation of an automotive steering wheel. For example, such apparatus produces a reference position signal when the automobile is running straight.

2. Description of the Prior Art

There have been proposed an apparatus for detecting a rotation of an automotive steering wheel by making use of transmission or reflection of light or bymeans of magnetism.

These known apparatus, however, could not provide a reference position signal representing the straight running of the automobile by a simple way, unless the rotation signals from the electric circuits are further electrically processed by the complicated electric circuits.

SUMMARY OF THE INVENTION

Accordingly, an object of the invention is to provide a steering wheel rotation detecting apparatus in which a reference position signal is obtained without any complicated electronic signal processing circuit which produces the reference position signal from the detected rotation signals.

To this end, according to the invention, there is provided a steering wheel rotation detecting apparatus in which two reference position signal detecting means are arranged for rotation at different speeds in response to the rotation of the steering wheel such that a reference position signal is produced at one reference position.

BRIEF DESCRIPTION OF THE DRAWINGS

FIGS. 7 and 8A to 8C are time charts for illustrating the operation of the rotation detecting circuit;

DESCRIPTION OF THE PREFERRED EMBODIMENTS

Figure 1:
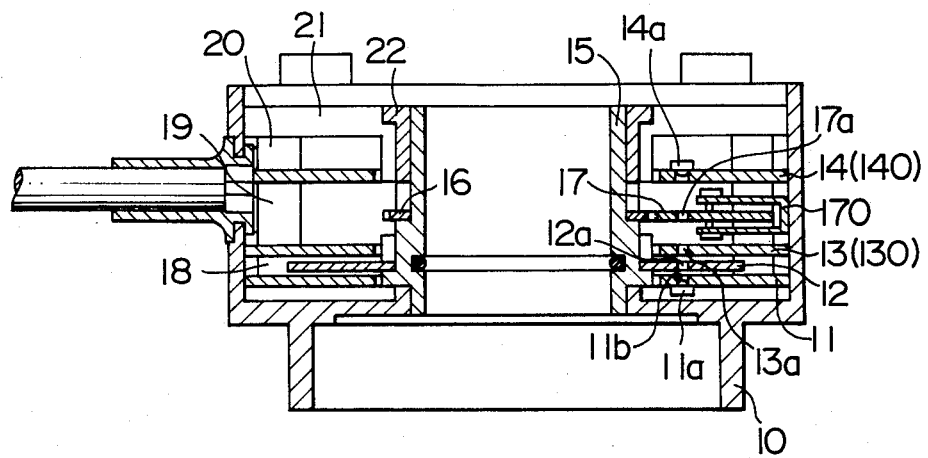
FIG. 1 is a sectional view of an embodiment of the invention.

FIG. 1 shows an embodiment of steering wheel rotation detecting apparatus in accordance with the invention. The apparatus includes a housing 10 and a first stationary plate 11 fixed to the housing 10. A light-emitting element 11a is fixed at a position corresponding to the position of an opening 11b formed in the first stationary plate 11.

A reference numeral 12 designates a rotary plate in which an opening 12a is formed as a first reference signal detector. While a numeral 13 denotes a second stationary plate fixed to the housing 10. The second stationary plate 13 has a reference signal detecting circuit 140 and has an opening 13a formed therein. A stationary plate 14 is fixed to the housing 10 and carries a detecting circuit 130. The stationary plate 14 has an opening 14b photo-detecting element 14a provided at a position corresponding to the opening 14b.

A shaft 15 is fixed to, for example, the steering shaft of the automobile such as to rotate in accordance with the rotation of the steering wheel. The rotary plate 12 is mounted onto the shaft 15 without any relative rotation therebetween.

A reference numeral 16 designates a first gear which is mounted onto the shaft 15 without any relative rotation therebetween.

A reference numeral 16 designates a first gear which is mounted onto the shaft 15 without any relative rotation therebetween. A second gear 17 is disposed such as to mesh with the first gear 16. The second gear 17 is rotatably journaled in a bracket 170 fixed to the housing 10. The second gear 17 is provided therein with an opening 17a as a second reference position detector. The first stationary plate 11, the rotary plate 12, the second stationary plate 13 and the detecting circuit 130 (detailed later) constitute a rotation detecting means. On the other hand, a reference position detecting means is constituted by the first gear 16 fixed to the shaft 15, the second gear 17 and the opening 12a formed in the rotary plate 12. The first and second gears 16 and 17 in combination constitute a reducing means.

Figure 2:
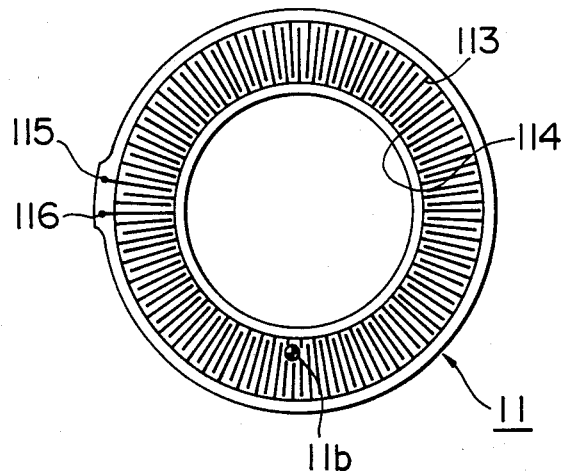
FIGS. 2, 3A, 3B and 4 are plan views of the respective plates incorporated in the embodiment shown in FIG. 1.

Referring now to FIG. 2 showing a surface of the first stationary plate 11 facing the rotary plate 12, first and second electrodes 113 and 114 are arranged alternatingly in the circumferential direction at a constant pitch.

Figure 3A:
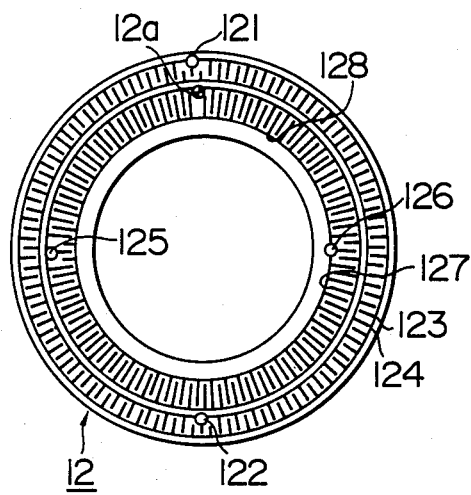
Figure 3B:
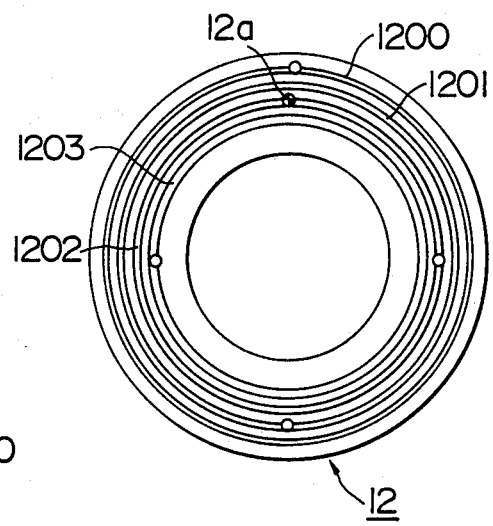

FIG. 3A shows one of the opposite surfaces of the rotary plate 12 facing the first stationary plate 11. It will be seen that this surface carries electrodes 123 and 124 arranged such as to oppose the first and second electrodes 113 and 114 on the first stationary plate 11. These electrodes 123 and 124 are connected to ring electrodes 1200 and 1201 on the other side of the rotary plate 12 (see FIG. 3B) through junctions 121 and 122. Numerals 127 and 128 denote electrodes which are arranged to oppose the first and second electrodes 113 and 114 on the first stationary plate 11 when the electrodes 123 and 124 are not in alignment with the first and second electrodes 113 and 114 on the first stationary plate 11. The electrodes 127 and 128 on the rotary plate 12 are connected to ring electrodes 1202 and 1203 on the other surface of the rotary plate 12 through junctions 125 and 126.

Figure 4:
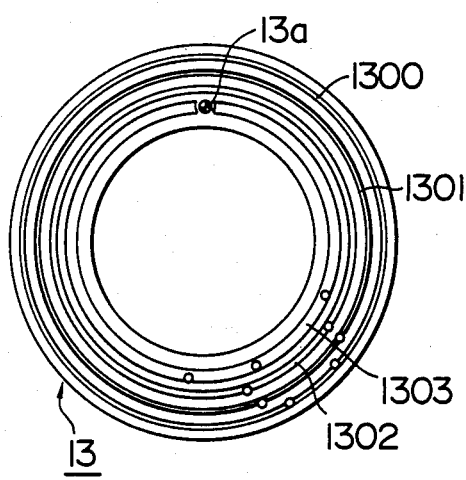

FIG. 4 shows a surface of the second stationary plate 13 facing the rotary plate 12. It will be seen that this surface of the second stationary plate 13 has ring electrodes 1300, 1301, 1302 and 1303 disposed to oppose the ring electrodes 1200, 1201, 1202 and 1203 on the other surface of the rotary plate 12.

Figure 5:
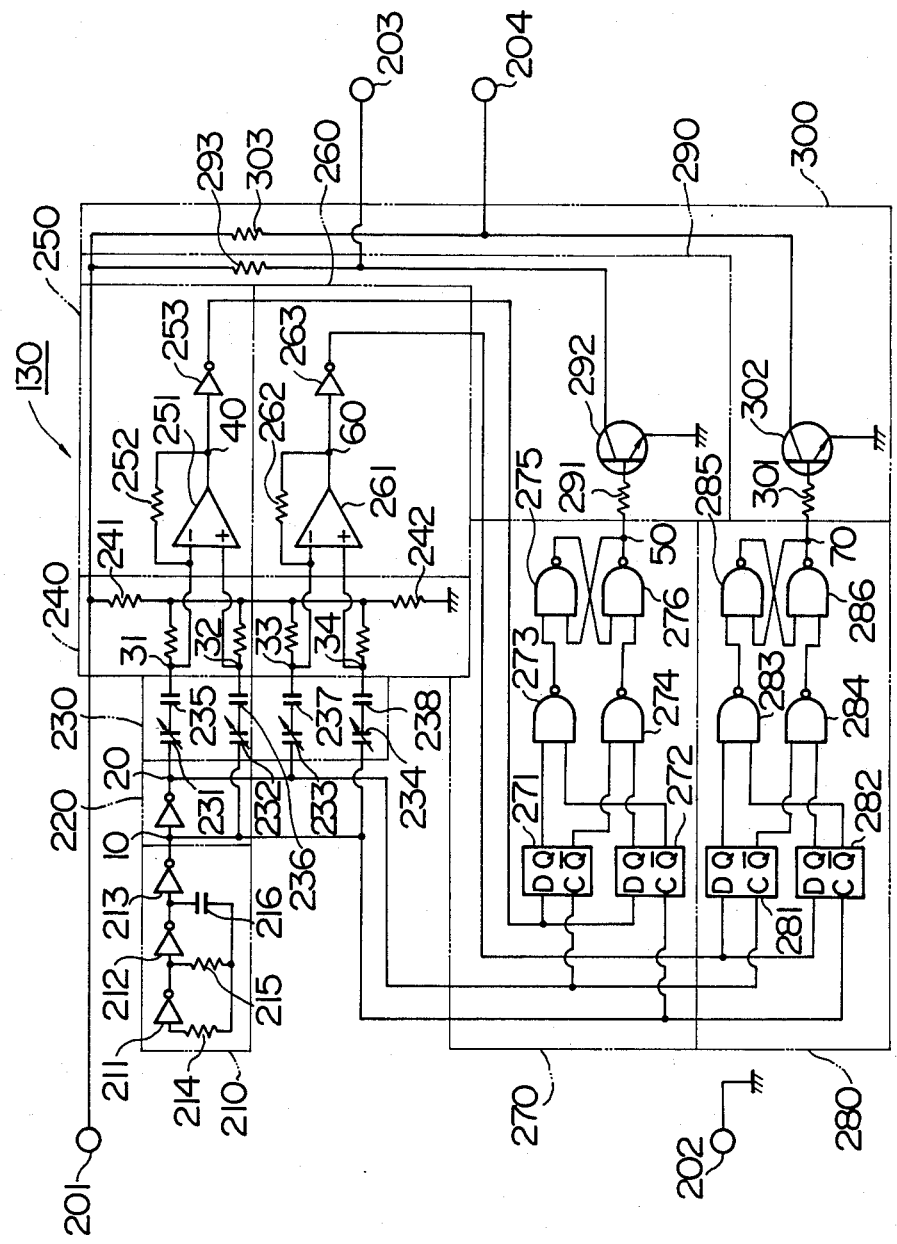
FIG. 5 is an electric connection diagram of a rotation detecting circuit.

Referring now to FIG. 5 which is an electric connection diagram of the detecting circuit 130 mentioned before, a constant voltage Vc is applied between a power supply terminal 201 and a ground terminal 202. The circuit 130 includes a CR oscillation circuit 210 known per se and a reference signal generating circuit 220 which is combinatin constitute a periodic signal supplying circuit. A reference numeral 230 designates a rotation detecting means constituted by the electrodes mentioned before, i.e., the electrodes 113, 114, 123, 124, 127, 128 and the electrodes 1200, 1201, 1203, 1300, 1301, 1302 and 1303. A reference numeral 240 designates a reference voltage circuit. Numerals 250 and 260 denote first and second comparator circuits, respectively. Numerals 270 and 280 denote first and second phase detecting circuit, respectively. Numerals 290 and 300 denote travel distance detecting circuits, and numerals 203 and 204 denote output terminals.

Figure 5A:
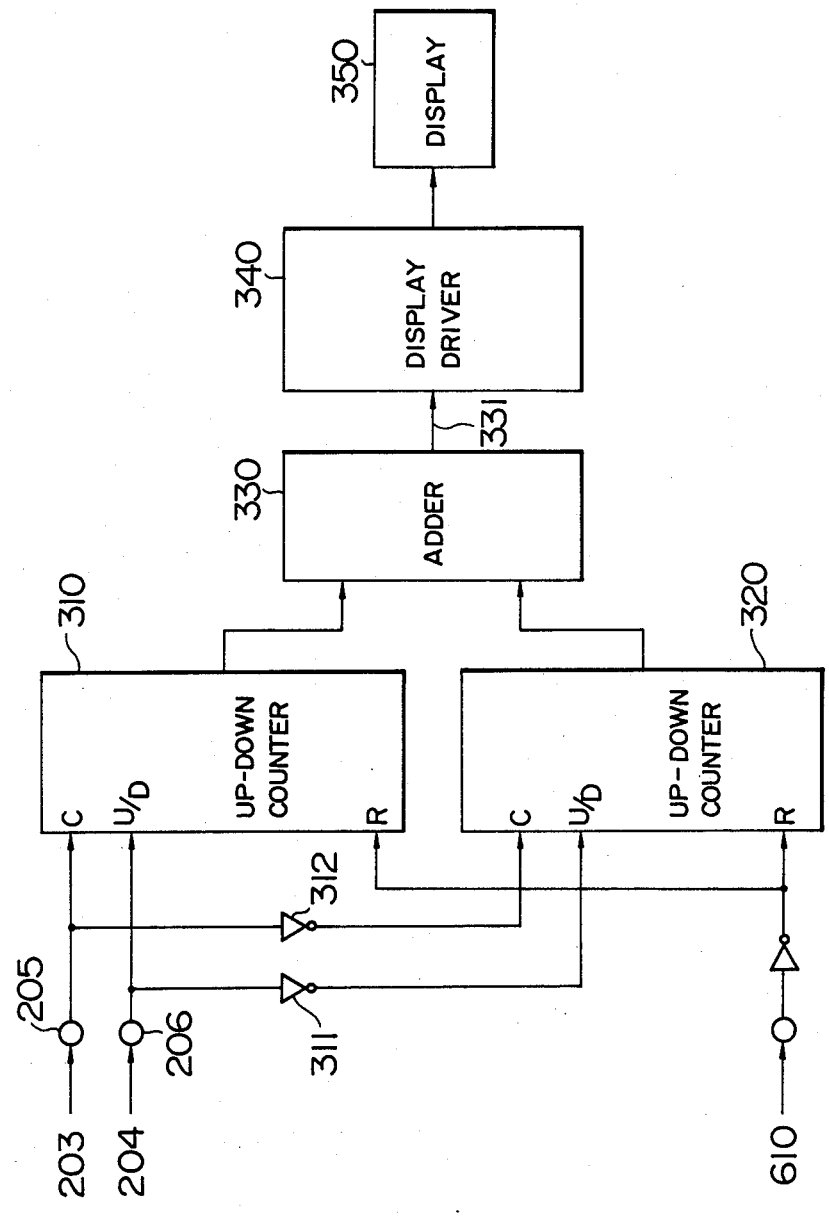
FIG. 5A is a block diagram of a digital display means.

In operation, a signal 510 having a waveform as shown in FIG. 5A is obtained by the CR oscillating circuit 210 which is constituted, as shown in FIG. 5, by inverter gates 211, 212, 213, resistors 214, 215 and a capacitor 216. The signal 510 is transmitted to the reference signal generating circuit 220. As a result, a signal of the same phase as the signal 510 and a signal 520 of a phase inverse of the phase of the signal 510 (see FIG. 7) appear at the terminals 10 and 20, respectively. As will be seen from FIGS. 6A to 6D, these signals 510 and 520 are delivered respectively to the first and second electrodes 113 and 114 on the input side of the first stationary plate 11. As the rotary plate 12 rotates, first, second, third and fourth electrodes 123, 124, 127 and 128 on the rotary plate 12 are brought into alignment with the first and second electrodes 113 and 114 on the first stationary plate 11, as shown in FIGS. 6A to 6D.

It is assumed here that as the rotary plate 12 has been rotated by means of the rotation of the shaft 15 (see FIG. 1), the first electrode 123 on the rotary plate 12 is aligned with the first electrode 113 on the first stationary plate 11 while the second electrode 124 on the rotary plate 12 is aligned with the second electrode 114 on the first stationary plate 11. When a signal of the same phase as the signal 510 is applied to the first electrode 113 on the first stationary plate 11 from a junction 115 (see FIG. 2) on the first stationary plate 11, a signal of the same phase as the signal 510 appears at the junction 121 shown in FIG. 3A through a capacitor 231 (see FIG. 5) which is constituted by the first electrode 113 on the first stationary plate 11 and the second electrode 123 on the rotary plate 12, allows this signal is transmitted to the first comparator circuit 250 as the signal 31-a shown in FIG. 7 through another capacitor 235 (see FIG. 5) which is constituted by the ring electrode 1200 on the rotary plate 12 and the ring electrode 1300 on the second stationary plate 13. Similarly, when the signal 520 is transmitted to the second electrode 114 on the first stationary plate 11 from the junction 116 (see FIG. 2), a signal of the same phase as the signal 520 appears on the electrode 124 on the rotary plate 12 through a capacitor 232 (see FIG. 5) constituted by the second electrode 114 on the first stationary plate 11 and the electrode 124 on the rotary plate 12. This signal is transmitted as the signal 33-a shown in FIG. 7 to the first comparator circuit 250 through a capacitor 236 (see FIG. 5) which is constituted by the ring electrode 1201 on the rotary plate 12 and the ring electrode 1301 on the second stationary plate 13. It is to be understood that the signals 31-a and 33-a have waveforms based on a voltage Va (see FIG. 7) which is determined by the resistors 241 and 241 of the reference voltage circuit 240.

The signals 31-a and 33-a are amplified by a differential amplifier constituted by an operational amplifier 251 of the first comparator circuit 250 and the resistor 252. Consequently, a signal 40-a (see FIG. 7) having a phase which is lagged by ΔT is caused by a delay of response of the capacitor and the delay in the switching of the operation amplifier 251. The signal 40-a is then shaped by the inverter gate 253, so that a signal of a phase inverse of the signal 40-a is transmitted to the data terminals D of the D-type filp-flops 271 and 272 in the first phase detecting circuit 270. On the other hand, the data terminals C C of the D-type flip-flop 271 and 272 receive a signal of a phase inverse of the signal 510 from the CR oscillation circuit 210. In consequence, signals "1" and "0" appear on the output terminals Q of the D-type flip-flops 271 and 272, respectively, Meanwhile, a signal "0" appears on the terminal 50 through the NAND gates 273, 274, 275 and 276. This signal is transmitted through the resistor 291 to an output circuit 290, so that the transistor 292 is turned off. Accordingly, a first rotation signal 51 at level "1" (see FIG. 7) appears at the output terminal 203, which is indicative of a fact that the electrode 123 on the rotary plate 12 is aligned with the first electrode 113 on the stationary plate 11 or, alternatively, a fact that the electrode 124 on the rotary plate 12 is aligned with the second electrode 114 of the first stationary plate 11. In this state, no signal waveform appears in the ring electrodes 1302 and 1303 on the second stationary plate 13 because neither the electrode 127 nor the electrode 128 on the rotary plate 12 is aligned with the corresponding electrode on the first stationary plate 11. Therefore, the "0" level signal 60-a shown in FIG. 7 appears on a terminal 60 (see FIG. 5), so that a signal of "1" level appears on the terminal 70 (see FIG. 5) and then a second rotation signal 71 at "0" level (see FIG. 7) appears on the output terminal 204.

Figure 6A:
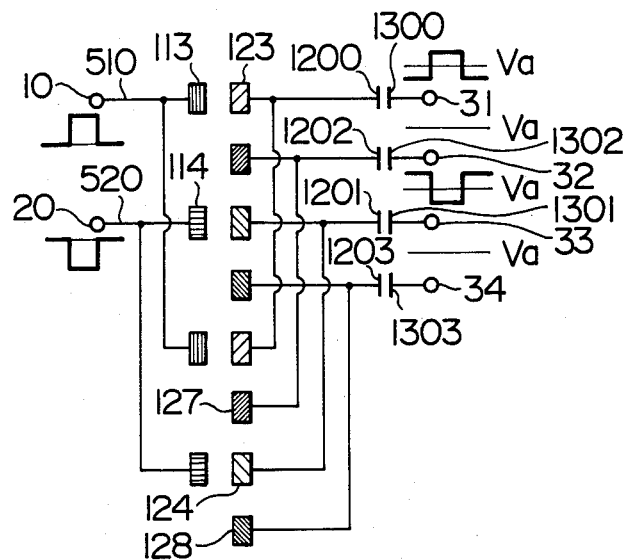
FIGS. 6A to 6D are illustrations showing the relationship between the electrodes of the stationary and the rotatary plates in the respective stages.
Figure 6B:
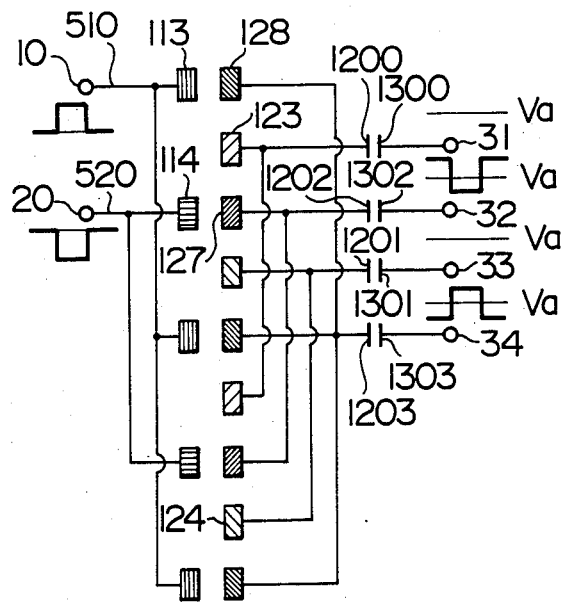

When the shaft 15 is further rotated to a position where as shown in FIG. 6B, the fourth electrode 128 on the rotary plate 12 is aligned with the first electrode 113 on the first stationary plate 11 while the third electrode 127 on the rotary plate 12 is aligned with the second electrode 114 on the first stationary plate 11, a signal of the same phase as the signal 520 appears on the electrode 127 on the rotary plate 12, so that a signal 32-a (see FIG. 7) based upon the voltage Va is obtained at the ring electrode 1302 on the second stationary plate 13. On the other hand, a signal of the same phase as the signal 510 appears on the electrode 128 of the rotary plate 12, so that a signal 34-a (see FIG. 7) based on the voltage Va is obtained at the ring electrode 1303 on the second stationary plate 13. As a result, a signal 60-b (see FIG. 7) appears on the output terminal of the second comparator circuit 260 and then a signal of "0" level is obtained at the output terminal 70 of the second phase detecting circuit 280. At the same time, a second rotation signal 72 of "1" level (see FIG. 7) appears on the output terminal 204, which indicates that the electrode 127 on the rotary plate 12 is aligned with the second electrode 114 on the first stationary plate 11.

Figure 6C:
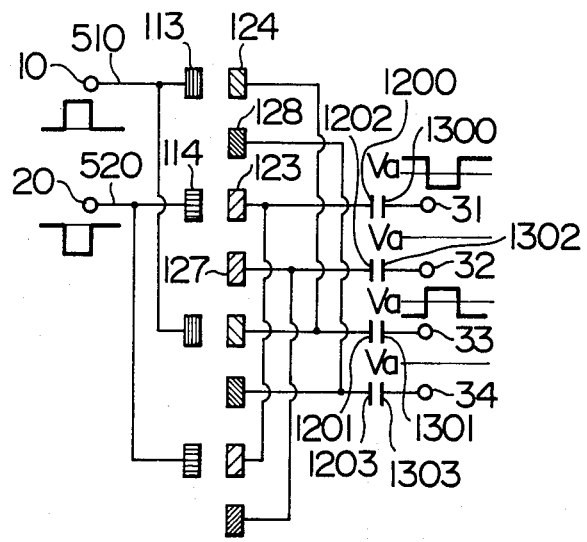

When the shaft 15 is further rotated to a position where the electrodes 124 and 123 on the rotary plate 12 are aligned with the first and the second electrodes 113 and 114 on the first stationary plate 11, respectively as shown in FIG. 6C, a signal of the same phase as the signal 510 appears on the electrode 123 on the rotary plate 12 and then a signal 31-b (see FIG. 7) based on the voltage Va appears on the ring electrode 1301 of the second stationary plate 13. On the other hand, a signal 520 of the phase inverse of the phase of the signal 510 appears on the electrode 123 of the rotary plate 12 and a signal 33-*b* (see FIG. 7) based on the voltage Va appears at the ring electrode 1300 on the second stationary plate 13. In consequence, a signal 40-*c* (see FIG. 7) appears on the output terminal of the first comparator circuit 250 and a signal of "1" level appears on the output terminal 70 of the first phase detecting circuit 280. At the same time, the first rotation signal 52 of "0" level (see FIG. 7) is appears at the output terminal 203, which indicates that the electrode 123 of the rotary plate 12 is aligned with the electrode 114 on the first stationary plate 11.

Figure 6D:
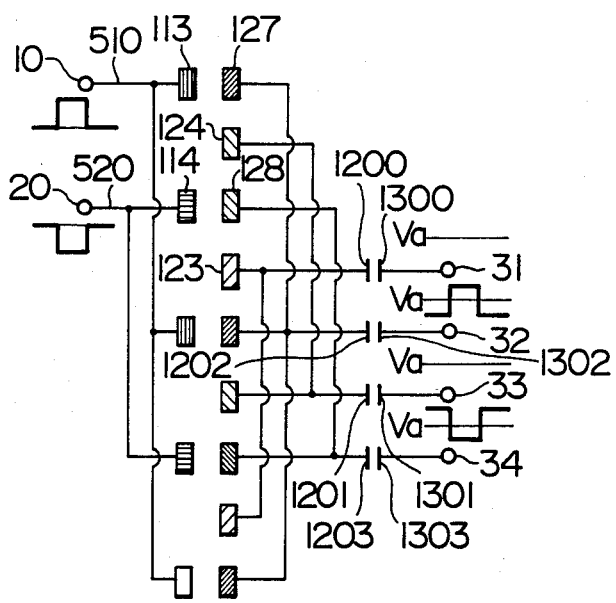

When the shaft 15 (see FIG. 1) is further rotated to a position where as shown in FIG. 6D, the electrodes 127 and 128 on the rotary plate 12 are aligned with the first and second electrodes 113 and 114 on the first stationary plate 11, respectively, a signal of the same phase as the signal 510 appears on the electrode 127 on the rotary plate 12 and then a signal 32-*b* (see FIG. 7) based on the voltage Va appears at the ring electrode 1302 of the second stationary plate 13. On the other hand, a signal of the same phase as the signal 520 appears at the electrode 128 on the rotary plate 12 and a signal 34-*b* (see FIG. 7) based on the voltage Va is obtained at the ring electrode 1303 on the second stationary plate 13.

In consequence, a signal 60-*d* (see FIG. 7) appears at the output terminal of the second comparator circuit 260 and a signal of "1" level is obtained at the output terminal 70 of the second phase detecting circuit 280. At the same time, the second rotation signal 73 (see FIG. 7) of "0" level appears at the output terminal 204, which indicates that the electrode 127 on the first stationary plate 11 is aligned with the first electrode 113 of the first stationary plate 11.

Figure 8A:
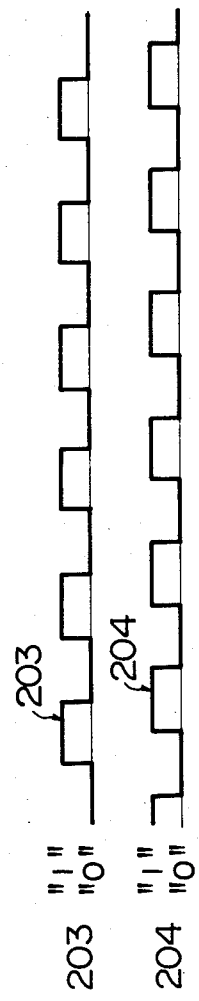

Thus, signals of "1" level or "0" level alternatingly appear at the output terminals 203 and 204 as the electrodes 123, 124, 127 and 128 on the rotary plate 12 pass over the first and second electrodes 113 and 114 on the first stationary plate 11 by means of the rotation of the shaft 15. When the shaft 15 rotates in one direction, signals of "1" or of "0" level alternatingly appear to partially overlap with each other at the terminals 203 and 204, as shown in FIG. 8A.

Figure 8B:
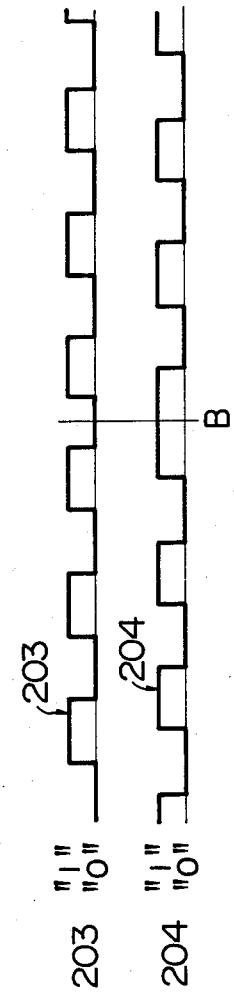

When the shaft rotation is reversed at a point B (see FIG. 8B), signals shown in FIG. 8B follow at the terminals 203 and 204. On the other hand, when shaft rotation is reversed at a point C (see FIG. 8C), signals shown in FIG. 8C follow at the terminals 203 and 204.

An explanation will be made hereinunder as to the reference position detecting means which is constituted by the opening 12*a* formed in the rotary plate 12, the opening 17*a* formed in the second gear 17 meshing with the first gear 16.

Figure 9:
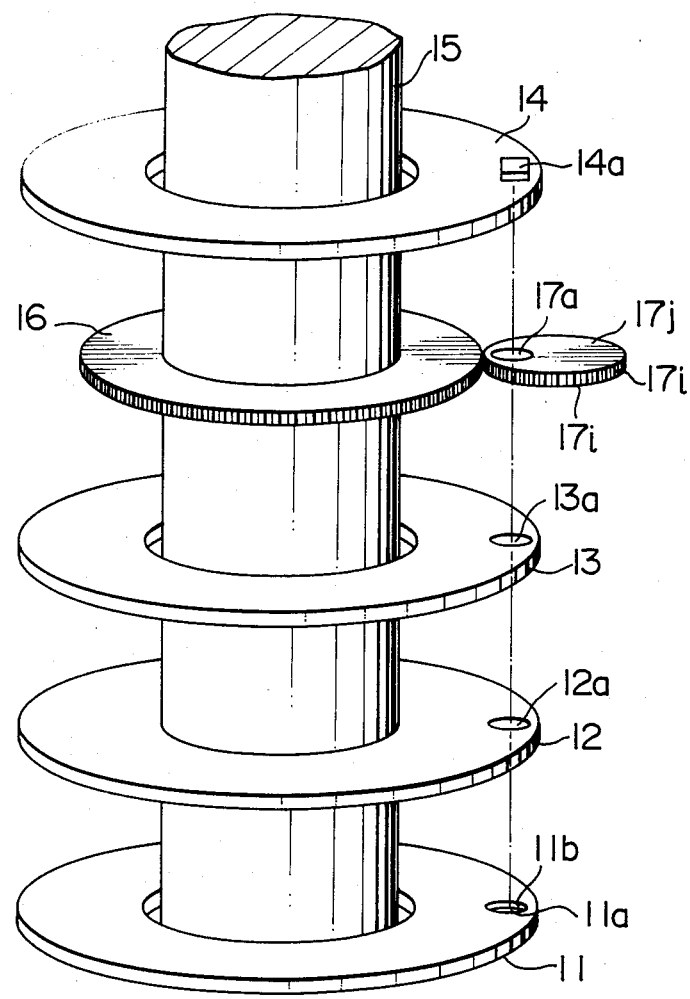
FIG. 9 is a fragmentary enlarged perspective view of a reference position detecting means.

Referring to FIG. 9, when the steering wheel is in a reference position e.g. a straight running of the automobile, the light-emitting element 11*a*, the opening 12*a* in the rotary plate 12, the opening 13*a* in the second stationary plate 13, the opening 17*a* in the second gear 17, and the photo-detecting element 14*a* are all aligned with a common line which is called an optical axis hereinafter. In this state, the light photo-detecting element 14*a* directly without any interruption.

Figure 10:
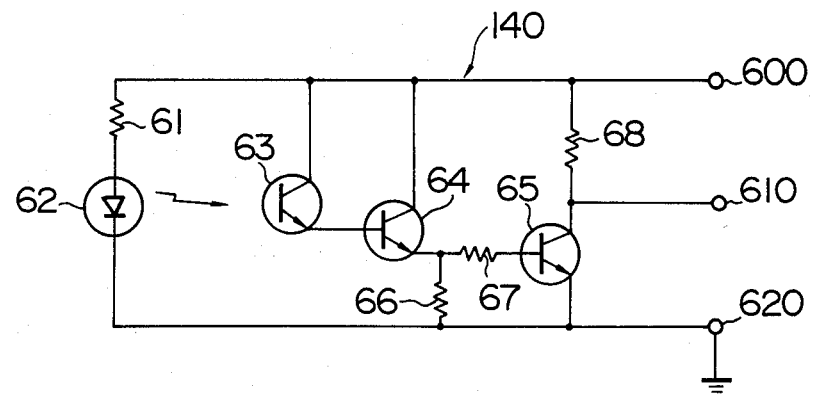
FIG. 10 is an electric connection diagram of a reference position detecting circuit.

The detail of the reference position detecting circuit 140 is shown in FIG. 10. As will be seen from this Figure, the reference position detecting circuit 140 includes a light-emitting element 62, a photo-detecting element 63, resistors 61, 66, 67 and 68, and transistors 64 and 65. A numeral 600 denotes a power suply terminal to which a constant voltage is supplied. Numerals 610 and 620 denote an output terminal and a ground terminal, respectively.

Figure 11:
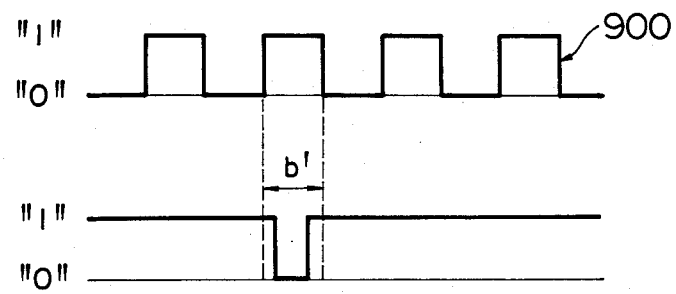
FIG. 11 is a time charg for illustrating the operation of the reference position detecting circuit.

As the light is received by the photo-detecting element 63 (i.e. element 14*a* in FIG. 1), both transistors 64 and 65 are turned on, so that a signal of "0" level appears at the output terminal 610 during a range b' shown in FIG. 11. Then, as the rotary plate 12 and the second gear 17 are rotated in accordance with the rotation of the shaft 15, the light emitted from the light-emitting element 62 (i.e. element 11*a* in FIG. 1) is interrupted by the rotary plate 12, so that it cannot reach the photo-detecting element 63. In consequence, the transistor 65 is turned off and then a signal of "1" level appears at the output terminal 610 except the range b' shown in FIG. 11.

If the automotive steering wheel is designed to be able to make 3.5 turns from one locking position to the other, e.g. the gear ratio between the first gear 16 and the second gear 17 are selected to be 1:35, after a one full rotation of the shaft 1 from the reference position, the opening 12*a* in the rotary plate 12 is brought again into alignment with the optical axis, however the opening 17*a* formed in the second gear 17 is not aligned with the optical axis.

Figure 12:
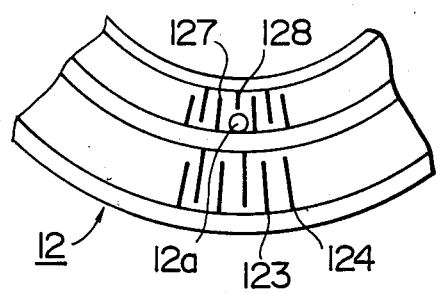
FIG. 12 is a fragmentary enlarged view of the rotary plate shown in FIG. 1.

FIG. 12 is a fragmentary enlarged plan view showing a part of the surface of the rotary plate 12 facing the stationary plate 11, and in particular showing the relationship between the electrodes 127, 128 and the opening 12*a*. The opening 12*a* is formed in a portion of the rotary plate 12 the electrode 128 which alignes with not only the electrode 128 but the optical axis and, therefore, is spaced from the electrode 127.

Since the opening 12*a* is formed in the electrode 128 on the rotary plate 12, a reference signal is produced in a half period of the rotation signal 900 (denoted by 203 or 204 in FIGS. 8A to 8C) as shown in FIG. 11.

It will be explained hereinbelow how the angular displacement of the shaft is displayed in digital by using various signals described hereinabove.

FIG. 5A is a block diagram of a digital display means. The digital display means has terminals 205 and 206 which are connected to the output terminals 203 and 204 of the detecting circuit 130. The terminals 205 and 206 are also connected to the clock terminal C and the up-down terminal U/D of the up-down counter 310, respectively. Furthermore, the terminals 205 and 206 are connected through inverter gates 312 and 311 to the clock terminal C and the up-down terminal U/D of another up-down counter 320, respectively. Numerals 330 and 340 denote an adder and a drive circuit for the display 350, respectively. The display means operates in the following manner, in response to the signals shown in FIG. 8A received by the terminals 205 and 206.

When the first signal 203 transmitted to the clock terminal C of the up-down counter 310 rises, the second signal 204 transmitted to the up-down terminal U/D of the up-down counter 310 takes the "0" level without exception, so that the up-down counter 310 counts up when the signal 203 rises. The clock terminal C of the up-down counter 320 receives a signal of a phase inverse of the phase of the first signal 203, while the up-down terminal U/D of the same receives a signal of a phase inverse of the phase of the second signal 204. Therefore, when the signal 203 falls, a signal of "0" level appears at the up-down terminal U/D, so that the up-down counter 320 counts up when the first signal 203 falls. The outputs from the up-down counters 310 and 320 are transmitted to an adder 330, so that signal which is added by 1 (one) in response to each rise and each fall of the first signal 203 appears in the line 331. This signal in the line 331 is sent to a display 350 through a device circuit 340, so that the angular displacement of the shaft is displayed in digital.

When the signal as shown in FIG. 8 is transmitted, after the point B at which the shaft rotation is reversed, the level of the up-down terminal U/D of the up-down counter 310 is changed from "0" to "1" at the rise of the first signal 203 and the level of the up-down counter U/D of the up-down counter 320 is changed from "0" to "1" at the fall of the first signal 203. In consequence, after the point B, a value which is subtracted by 1 (one) in response to each rise and each fall of the first signal 203 is displayed on the display 350 in digital.

Figure 8C:
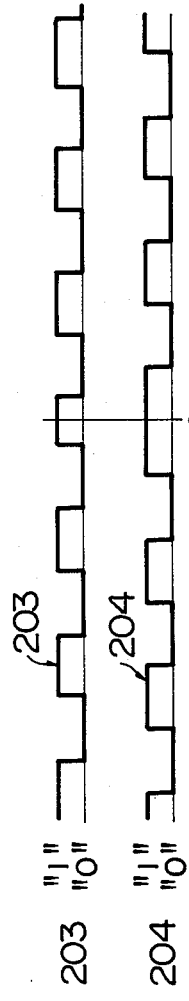

Similarly, when the signal as shown in FIG. 8C is transmitted, the levels of the up-down terminals U/D of both up-down counters 310 and 320 are changed from "1" to "0" at every rise and fall of the first signal 203, after the point C at which the shaft rotation is reversed. In consequence, a signal which is added by 1 (one) in response to each rise and each fall of the first signal 203 appears on the line 331.

Referring back to FIG. 5A, when the reference position signal is delivered to the reset terminals R of the U/D counters through the terminal 610, the counters are reset and the output of the adder 330 is changed to "0".

The apparatus of the invention, although not exclusively, is adapted to be attached to a steering wheel shaft for the purpose of detecting the straight running state of an automobile, as well as the angle of rotation of the steering wheel. Thus, the apparatus of the invention can be used in a warning device for warning the driver of a fact that the steering wheel has been rotated beyond a predetermined limit, as well as in a return trip guiding device.

In another embodiment of the invention, not only a light-emitting element but a photo-detecting element are disposed in the opening 11b. A reflecting mirror is provided at the second reference position detector on a surface of the second gear 17 in place of the opening 17a in the first embodiment. It will be clear to those skilled in the art that the same signals as those obtained in the first embodiment are sensed by the photo-detecting element in response to the rotation of the shaft 15.

In still another embodiment, to the contrary, a light-emitting element and a light-receiving element are disposed in the opening 14b formed in the stationary plate 14, and a reflecting mirror having a reflecting surface opposing the light-emitting and photo-detecting elements is positioned on a portion of the rotary plate 12 corresponding to the position of the opening 12a.

In the first embodiment, the gear ratio between the gears 16 and 17 is selected to be 1:35. This, however, is not exclusive and any desired gear ratio which allows the simultaneous alignment of the opening 12a in the rotary plate 12 and the opening 17a in the second gear 17 with the optical axis only once in the lock-to-lock rotation of the steering wheel can be used.

It will be understood also that any mechanism which can reduce the rotation speed of the shaft 15 can be used in place of the combination of meshing gears 16 and 17 as the reducing means.

Although in the described embodiments, the reference position signal is generated when the automobile is running straight, the reference position signal can be generated in other state or position of the steering wheel, provided that the reference position signal is generated only once during the lock-to-lock rotation of the steering wheel.

It will be understood also that the shape, size and the position of the opening 12a in the rotary plate 12 may be changed if the relationship shown in FIG. 11 is maintained between the rotation signal and the reference position signal, although in the first embodiment the opening 12a is formed in the electrode 128 in alignment with the optical axis.

Other changes and modifications are possible within the scope of the invention which is limited solely by the appended claims.

What is claimed is:

1. An apparatus for detecting a rotation of a steering wheel comprising:
    a rotary plate mounted to a shaft without a relative rotation therebetween, said shaft being rotatable in accordance with a rotation of said steering wheel;
    means for detecting a rotation of said rotary plate;
    a rotary member rotatable in accordance with a rotation of said shaft;
    a first means for detecting a reference position signal provided in said rotary plate;
    a second means for detecting a reference position signal provided in said rotary member;
    a reduction means for reducing the rotational speed of said rotary member such as to allow said first and second signal detecting means to be aligned with each other once in a plurality of rotations of said shaft; and
    means for detecting a reference position disposed in a line passing through said first and second signal detecting means, said position detecting means outputting a reference position signal upon an alignment of said first and second signal detecting means with said line.

2. An apparatus acoding to claim 1, wherein said position detecting means includes a light emitting element and a photo-detector, and wherein said first and second signal detecting means include openings, respectively, which permit the light to pass therethrough from said light emitting element to said photo-detector upon an alignment of said first and second signal detecting means with said line.

3. An apparatus according to claim 1, wherein said rotation detecting means includes an electrostatic capacity type detector.

4. An apparatus according to claim 2, wherein said rotation detecting means includes an electrostatic capacity type detector.

5. An apparatus for detecting a rotation of a steering wheel comprising:
    a rotary plate mounted to a shaft without a relative rotation herebetween, said shaft being rotatable in compliance with a rotation of said steering wheel;
    means for detecting a rotation of said rotary plate, said detecting means being disposed to locate said rotary plate therebetween;
    a rotary member rotatable in compliance with a rotation of said shaft;
    a first means for detecting a reference position signal provided in said rotary plate;
    a second means for detecting a reference position signal provided in said rotary member;
    a reduction means for reducing the rotational speed of said rotary member such as to allow said first and second signal detecting means to be aligned with each other once in a plurality of rotations of said shaft; and means for detecting a reference position including a light emitting element and a photo-detector, both of which being disposed in the same side of said first or second signal detecting means, and said light emitting element and said photo-detector being so positioned that the incident light from said light emitting element is deflected and received by said photo-detector but is not deflected upon an alignment of said first and second detecting means.

6. An apparatus according to claim 1, wherein said rotation detecting means outputs a high level or low level signal in accordance with a rotation of said rotary plate, and wherein the reference position signal is outputted during a one half of a cycle in which said rotation detecting means outputs a high level or low level signal.

* * * * *